| United States Patent [19] | [11] 3,888,813 |
|---|---|
| Moult et al. | [45] June 10, 1975 |

[54] TIRE CORD DIP FOR POLYESTER FIBERS

[75] Inventors: Roy H. Moult; Richard T. Hood, both of Murrysville, Pa.

[73] Assignee: Koppers Company, Inc., Pittsburgh, Pa.

[22] Filed: May 28, 1974

[21] Appl. No.: 473,439

Related U.S. Application Data

[63] Continuation of Ser. No. 373,274, June 21, 1973, abandoned, which is a continuation-in-part of Ser. No. 232,270, March 6, 1972, abandoned, which is a continuation-in-part of Ser. No. 105,552, Jan. 11, 1971, abandoned, which is a continuation-in-part of Ser. No. 815,491, April 11, 1969, abandoned.

[52] U.S. Cl. ......... 260/29.3; 117/138.8 F; 156/335; 260/54; 260/57 R; 260/844; 260/845; 260/846
[51] Int. Cl. ............................................. C08g 51/24
[58] Field of Search ........ 260/29.3, 54, 58, 59, 844, 260/845, 846, 57 R; 117/138.8 F; 156/335

[56] References Cited
UNITED STATES PATENTS

| 2,489,336 | 11/1949 | Spahr et al. | 260/54 |
|---|---|---|---|
| 2,531,863 | 11/1950 | Scott et al. | 260/54 |
| 2,614,096 | 10/1952 | Spahr | 260/54 |
| 2,758,101 | 8/1956 | Shappell | 260/29.3 |
| 3,194,294 | 7/1965 | Van Gils | 260/845 |

Primary Examiner—Lorenzo B. Hayes
Attorney, Agent, or Firm—Herbert J. Zeh, Jr.; Oscar B. Brumback; Olin E. Williams

[57] ABSTRACT

This invention provides a phenol-formaldehyde-rescrcinol resin having a high molecular weight and having the property of curing by itself, upon being subjected to heat, to form a thermoset resin. The resin is prepared in a specialized manner by pre-condensing and polymerizing phenol and formaldehyde to form a precondensate having a dilutability of from about 1:1.2 to about 1:0.8; reacting this precondensate with resorcinol; removing unreacted phenol and water of condensation by distillation; and finally removing unreacted resorcinol and low molecular weight condensation products or oligomers by aqueous acid washing. This phenol-formaldehyde-resorcinol resin in admixture with a rubber latex provides an excellent adhesive dip for treating, or coating, and eventually bonding polyester tire cord to rubber stock.

6 Claims, No Drawings

TIRE CORD DIP FOR POLYESTER FIBERS

CROSS REFERENCE TO RELATED APPLICATIONS

This is a continuation of application Ser. No. 372,274, filed June 21, 1973, which is a continuation-in-part of U.S. application Ser. No. 232,270 filed Mar. 6, 1972 which in turn was a continuation-in-part of application Ser. No. 105,552, filed Jan. 11, 1971 which in turn was a continuation-in-part of application Ser. No. 815,491 filed Apr. 11, 1969, all now abandoned.

BACKGROUND OF THE INVENTION

Many adhesive bonding systems for synthetic linear polyesters have been previously proposed. They suffer from various disadvantages including toxicity, for example, in the case of adhesives based on certain glycidyl ethers; complexity, such as a system based on a mixture of ten compounds including polyvinyl chloride, dioctyl phthalate, acetic acid, isopropyl alcohol, surfactants, ammonia, and a polyamide; instability, as in the case of adhesives based on polyisocyanates which hydrolyze readily in contact with moisture. In the case of adhesives based on phenol blocked isocyanates the adhesives, although stable to hydrolysis, precipitate in the aqueous dip composition. Also when the phenol-blocked isocyanates unblock when cured on the tire cord, poisonous phenol is released into the atmosphere.

It has also been found that phenol-resorcinol-formaldehyde based resins which have heretofor been used as wide purpose adhesives do not adhere well to polyester tire cords. For example see Tai, U.S. Pat. No. 3,578,613 which discusses this problem and at Example V, table III and at Example VI, illustrates that the excellent general purpose adhesives (comercially available under a number of trademarks such as Penacolite) do not bond well to polyesters.

The difficulty in achieving good adhesion to polyester, in contrast to polyamide or cellulosic materials, is not completely understood but nevertheless is explained by two theories.

The first theory is that polyester fibers absorb less moisture than polyamide or cellulosic materials thereby making the polyester fibers more difficult to wet with an aqueous adhesive dip. The difficulty in wetting leads to poor penetration of the polyester cords with aqueous adhesive solution.

The second theory lies in the relatively high frequency of active polar groups ($=NH$, $-OH$) along the macromolecular chains in polyamides and cellulose in contrast to polyesters in which similarly active polar groups ($-OH$, $-COOH$) are found only at the ends of the macromolecules. Consequently, when simple adhesive compositions which are effective for polyamide and cellulosic materials are applied to polyester surfaces, the results are poor.

Two particular prior teachings of interest are U.S. Pat. No. 2,211,951, issued to A. Hershberger and Irish Pat. No. 1161/66. The Hershberger patent teaches a product and a process for the bonding of cellulosic materials, particularly cellulosic threads, filaments, cords, and fabrics to rubber stock.

The Hershberger patent teaches an aqueous solution of an insoluble infusible interpolymeric synthetic resin made from a polyphenol, and aldehyde, and an additional compound capable of polymerizing with the aldehyde such as an amide or an alkyl phenol. The resin can be used in two ways: (1) The unpolymerized resin components can be added to the rubber latex and polymerized in situ on the tire cord under treating conditions; (2) The resin components can be partially polymerized by allowing a solution containing the polyphenol, the additional compound capable of polymerizing with an aldehyde and the aldehyde to stand at a temperature of from 25–30°C. for 5–20 hours during which time gradual condensation of the phenols and aldehyde and polymerization of the product takes place. This partially polymerized resin is then added to a rubber latex to form a dip solution. Dipping a rayon or nylon tire cord by a conventional process and drying the dip thereon greatly improves the degree of adhesion between the rayon or nylon cord and the rubber stock after their combination and vulcanization of the rubber. Unfortunately, neither embodiment taught by Hershberger is effective in bonding polyester tire cords to rubber stock.

Irish Pat. No. 1161/66 teaches the use of a resorcinol or substituted resorcinol-phenol or substituted phenol-aldehyde oligomer (a non-resinous or low molecular weight condensation product) as an improved tire cord adhesive for polyester fibers. Unfortunately, this non-resinous oligomer adhesive suffers from a number of disadvantages.

1. The oligomer is very difficult to prepare, requiring the reaction of the substituted phenol material with formaldehyde to give the addition product of a bis-hydroxymethyl derivative of the substituted phenol. Care must be taken that no condensation or resinification occurs. If further condensation or resinification occurs, the resulting product has poor solubility and as a result is not an effective adhesive for polyester tire cord dips. After the difficulty obtained addition product of bis-hydroxymethyl derivative of the substituted phenol is attained, it is then reacted with resorcinol or a substituted resorcinol compound to give an oligomer.

2. The oligomer does not bond polyester tire cord to rubber stock with the same degree of strength as older or conventional adhesives would bond cellulosic or polyamide cord to rubber stock.

From the foregoing, it can be seen that there is a definite need in the tire cord industry for a suitable adhesive which will bond polyester tire cord securely to rubber stock. Preferably, the adhesive should be easy to make and should securely bond the polyester tire cord to the rubber stock with a measure of strength equal to that which older resins would bond cellulosic or polyamide cord to rubber stock.

Quite surprisingly, it has been found that a phenol-formaldehyde resorcinol resin made in a convenient manner provides an adhesive which securely bonds polyester tire cords to rubber stock. The adhesive composition is easier to make than that prescribed in Irish Pat. No. 1161/66 and provides a 25 percent stronger bond between the tire cord and the rubber stock as that taught in the Irish Patent.

SUMMARY OF THE INVENTION

According to the present invention there is provided a phenol-formaldehyde-resorcinol resin which will bond polyester tire cord to rubber stock. The phenylene portion of the resin (phenol and resorcinol) is comprised of from about 55 to about 75 mole percent phenol preferably from about 60 to about 70 mole percent and from about 25 to about 45 mole percent, preferably from about 30 to about 40 mole percent of resorcinol. The formaldehyde portion of the resin is from about 60 to about 70 mole percent formaldehyde based on the moles of phenylene compound used (phenol plus resorcenol).

In addition to having the above critical composition, it is also necessary that the phenol-formaldehyde resorcinol resin be prepared using a certain critical process. The resin is first prepared by reacting the phenol and the formaldehyde to form a precondensate or resole. The reaction of the phenol and the formaldehyde is carried out at a temperature between about 60°C and the boiling point of the phenol-formaldehyde reaction mixture and at a pH of from about 8.0 to about 10.0. This precondensation reaction is continued until the phenol-formaldehyde reaction mixture has a dilutability of from about 1:1.2 to about 1:0.8 at the pH of the phenol-formaldehyde reaction mixture. The phenol-formaldehyde precondensate is then reacted with the resorcinol. The resorcinol is added and essentially completely reacted with the phenolformaldehyde precondensate to form a phenol-formaldehyde-resorcinol resin. This resin is then subjected to two purification steps to yield the desired phenol-formaldehyde-resorcinol resin. The resin is first subjected to a distillation step to remove substantially all of the water of condensation and the unreacted phenol. After the distillation the resin is acid washed. The acid washing with a dilute aqueous acid solution removes essentially all of the unreacted resorcinol and the low molecular weight water soluble condensation products (oligomers).

The phenol-formaldehyde-resorcinol resin prepared according to the above described process and using the above described concentration of ingredients is an excellent resin for bonding polyester tire cord to rubber stock. The resin is first combined with a conventional rubber latex such that the resin is present in an amount of 30–50 parts by weight resin per 100 parts of rubber latex solids. Sufficient water is present or added to adjust the total solids content of the tire cord dip to about 8–25 percent solids and the pH is adjusted to a value of about 8.0 to about 10.0. This tire cord adhesive is very useful for bonding polyester tire cord to rubber stock.

DETAILED DESCRIPTION

As mentioned above, the phenol-formaldehyde-resorcinol resin of this invention has a critical composition and is prepared by a critical multi-step process. The first step comprises a heated mildly alkaline catalyzed addition-condensation reaction of formaldehyde with phenol to form a precondensate or resole. The second step comprises the reaction of the precondensate with the resorcinol. Then the reacted phenol and water of condensation is removed by distillation. Finally, the resin is washed with a dilute aqueous acid to remove unreacted resorcinol and any low molecular weight condensation products.

In the first step a mixture of mono- and poly-methanolphenols, otherwise known as phenol alcohols, is first formed by addition of the formaldehyde to phenol (methylolation). As the temperature of the mixture is raised to reflux, methylolation is completed, and the first formed molecules further react with each other by condensation, that is by the splitting out of water, to form predominantly linear, or chain-like molecules. Some branching may occur but under the conditions herein described, only to a minor degree. Two types of condensation occur under the mild alkaline conditions of this process. One in which the methylol group of one phenol alcohol reacts with a non-substituted position of another phenol alcohol, or with an unreacted phenol molecule, to give a methylene bridge:

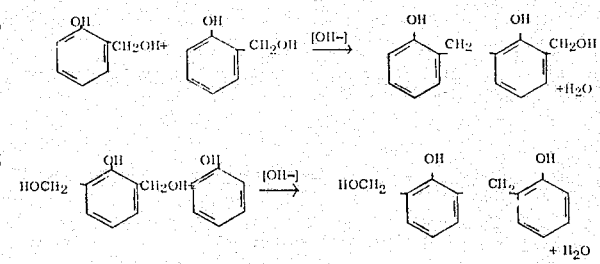

The other type of reaction by which a methylol group of one phenol alcohol reacts with a methylol group of another phenol alcohol to form a dibenzyl-ether type of molecule:

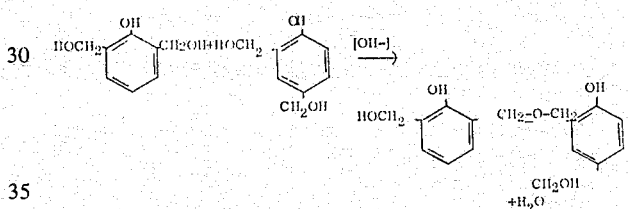

Both reactions will proceed further on longer heating to form a mixture of resinous molecules collectively known as a resole or precondensate. All of the formaldehyde is generally used up but some unreacted phenol will remain. The average molecular weight of the molecules will depend upon the extent of heating and on the amount of formaldehyde used. The solubility, or dilutability, will be gradually reduced as the methylol groups are reacted, since the solubility of the product depends upon both the molecular weight and upon the amounts of unreacted methylol groups.

In the second step resorcinol is added to the resole reaction mixture and the resorcinol molecules react vigorously with the resole molecules by way of the remaining methylol groups. However, because of the low concentration of the ingredients, here, the reaction still does not go all the way to completions, and unreacted resorcinol, as well as methylol-containing resole molecules ov various types, are present after the second step is completed.

After the addition and reaction of resorcinol, water and unreacted phenol are removed by distillation. During this step the resorcinol reaction is forced toward completion. Many of the reamining methylol groups still available will interact to form benzyl-ether linkages, at the high temperatures now present, while others will react with resorcinol. However, some of the resorcinol will still remain unreacted and must be removed by an acidic wash. Also any low molecular weight materials, oligomers, will be removed by the acid wash.

The phenol-formaldehyde-resorcinol resin of the invention is then combined with an aqueous rubber latex to form the polyester tire cord dip of the invention. Polyester tire cord is then passed through this dip where the cord becomes coated with the dip to produce the coated polyester tire cord which will bond to rubber stock.

For the practice of this invention, the formaldehyde to phenol mole ratio must be below about 1.1:1 preferably within the range of about 0.75:1 to about 1.1:1. If greater than the recommended ratios are employed large amounts of substituted methylol phenols would be formed which, upon subsequent condensation and resinification, would give a three-dimensional polymer network. This portion would be insoluble and not suitable in the practice of this invention. If lesser amounts of formaldehyde are used, the addition reaction would be imcomplete leaving considerable unreacted phenol, leading to a poor adhesive component.

After the reflux temperature of the phenol-formaldehyde reaction mixture has been attained, the methylolation is essentially complete. Under further reflux (from about 60–90 minutes), a condensation polymerization occurs giving a resin called a resole. The time of reflux is critical being carried only until a certain molecular weight is attained. The molecular weight is conveniently measured by dilutability, which is defined as the volume of water which, can be tolerated by a given volume of resin syrup at 25°C, to a point of incipient phase separation of the resin syrup and water. For a constant pH, the dilutability of a resin will be a function of molecular weight and of the amount of unreacted methylol groups. The higher the molecular weight and the less the amount of unreacted methylol groups, the less the dilutability. The dilutability of resoles made in accordance with this invention are in the rand of from about 1:1.2 to about 1:0.8 at the pH of the reaction mixture. If a greater or less dilutability were attained, the final phenol-formaldehyde-resorcinol resin, when subsequently combined with rubber latex would not be an effective adhesive. Table I infra shows the importance of the dilutability on adhesive strength. Based on dilutability measurements, the average molecular weight of the resin is from 1,000 to 1,600 and the resin contains considerable dibenzyl ether linkages.

Both the methylolation and condensation reactions discussed above are catalyzed under mildly alkaline conditions, preferably at a pH of from 8 to 10. Suitable catalysts include sodium and potassium hydroxides. The concentration of catalyst should be about 0.5 to 5 percent by weight based on weight of the phenol.

Phenol is a preferred constituent but substituted phenols are also envisioned in the invention. Such phenols include monoalkyl phenols in which the alkyl group, linear or branched, does not contain more than five carbon atoms, and dialkyl phenols in which the alkyl groups do not contain more than five carbon atoms. Such compounds include ortho- and para-cresol, 2,5-dimethyl phenol, and 2,6-dimethyl phenol. Also, mixtures of phenol and the above substituted phenols are contemplated in the invention.

Formaldehyde, or materials which are capable of yielding formaldehyde such as paraformaldehyde, is the preferred aldehyde of the invention. The concentration of aldehyde, as noted above, should be between 60 and 70 mole percent based on the moles of phenylene compound present (phenol and resorcinol) with a preferred amount of about 60 mole per cent based on total phenylene compound. Using less than the recommended amount of formaldehyde leads to incomplete resinification, and hence to an inferior adhesive dip. Using greater amounts, leads to the formation of branched resins too unstable for the present purpose.

The second step of the procedure of the invention comprises adding resorcinol to the phenol-formaldehyde precondensate. The resorcinol is added as quickly as possible and the condensation mixture is held at reflux for at least an additional 15 minutes. The time of the resorcinol reaction with the phenol-formaldehyde resole is not critical, but should be conducted so that the resorcinol is essentially completely reacted with the phenol-formaldehyde resole. However, if the reaction is not completed at this stage, it is not crucial, for, the reaction will be completed in the distillation step which follows. As mentioned above the amount of resorcinol used should be between about 25 and 45 mole percent of the phenylene compound, with a preferred concentration range of 30–40 mole percent of the phenylene compound.

After the addition and reaction of resorcinol, the water and unreacted phenol are removed by distillation. Distillation can be done at atmospheric pressure or can be begun at atmospheric pressure with the pressure being progressively lowered to about 26 to 28 inches of mercury. The temperature is generally increased from about 110° to 180°C. The distillation step, besides removing water and unreacted phenol, promotes reaction of any unreacted resorcinol with the phenol-formaldehyde resole.

The resin syrup must then be washed with a dilute aqueous acidic solution after the distillation to remove unreacted resorcinol and lower molecular weight condensation products or oligomers.

The step of washing with a dilute acidic aqueous solution comprises mixing the phenol-formaldehyde-resorcinol resin syrup with a volume of water adjusted to a pH of less than 7. The volume of the washing water or the number of washes is not critical with satisfactory performance being attained after one acidic wash with a volume of water equal to the volume of the resin syrup. The only requirement of washing with an acidic solution is that it effectively removes unreacted resorcinol and the lower molecular weight condensation products, oligomers, not removed in the distillation step.

Suitable acid solutions are weak organic acids, such as acetic, adipic, benzoic, butyric, propionic, citric, formic or oxalic, dissolved in water to about 0.5 to 5% by weight concentration. Also dilute solutions of inorganic acids such as sulfuric, hydrochloric phosphoric and the like can be used.

The resulting resin is generally a black, hard, brittle, glass-like solid that has a conchoidal fracture as does glass. It is insoluble in aqueous medium and soluble in an aqueous alkaline medium. When subjected to heat the resin evidences some incipient fusion and flow. At a temperature of 350°–400°C, the resin self-cures to a thermoset polymer and becomes infusible and insoluble under all conditions. The resin self-cures; no addition of any methylene donors such as formaldehyde or the like is needed for this cure. The resin structure contains dibenzyl ether linkages which, it is postulated, at the high temperature crack to aldehyde compounds which immediately interreact in the resin to effect a crosslinking or curing.

The phenol-formaldehyde-resorcinol resin prepared in accordance with the above process is now combined with an aqueous rubber latex to form the adhesive dip solution. The rubber latices useful in the adhesive dip of the present invention are the conventional latices used in the formation of the rubber adhesive dips. Suitable rubber latices are the synthetic rubber latices such as vinyl pyridine-styrene-butadiene copolymer latices sold commercially under the trademarks GEN-TAC, GOODRITE, or PYRATEX. Also hot polymerized (2000 Series) styrene-butadiene latices, cold-polymerized (2100 Series) styrene-butadiene latices, reclaimed rubber dispersions, butyl rubber dispersions, and ethylene-propylene-butadiene terpolymer rubber dispersions can be used.

Other latices include natural rubber latex which may be the crude rubber latex, or the latex which contains added material, or which has been treated to alter the character of the rubber, for instance, by degradation, or oxidation, or both. For instance, it may contain any desired accelerator vulcanizers, stabilizers, dispersing agents or any other substance such as are commonly used in the rubber industry. When rubber is used as an artificial dispersion of either natural or any known synthetic rubber, it may likewise contain additional substances as rubber accelerators, vulcanizers, stabilizers, dispersing agents, and the like. The type or kind of the rubber dispersion or rubber latex to be used depends to some extent upon the type or kind of rubber stock to which it is desired to bond the polyester tire cord. For example, to obtain good adhesion between polyester tire cord and synthetic rubber composed of halogen-2-butadiene-1,3-polymer, for example, chloro-2-butadiene-1,3-polymer stock, it is preferable to treat the polyester with an aqueous solution of resin combination with halogen-2-butadiene-1,3-polymer latex.

Besides the specified rubber latices and dispersions, any combination of the above is hereby disclosed for the purposes of this invention. A particularly effective combination is natural rubber latex blended at 25–75 percent with vinyl pyridine-styrene-butadiene terpolymer latices. The addition of natural latex not only improves adhesion but also gives a drier, cured cord. This phenomenon of better adhesion is illustrated in the examples that follows herein. The resin-adhesive dip, and aqueous solution, normally contain about 8 to 25 percent solids. Preferably, about 8 to 15 percent total solids is desired in the aqueous mixture with additional water being added if necessary to achieve the desired solids content. Lower than 8 percent solids provides poor adhesion. Greater than 25 percent dip solids also provides insufficient adhesion. The term "solids" as used in determining the solids content of the dip is used to define the amount of rubber and the amount of resin added, that is, the non-volatile portion of the dip.

The resin to rubber ratio of the adhesive dips should range between 10–50 parts resin per 100 parts rubber latex solids, that is, the amount of rubber, on a dry basis on the latex. Less than about 10 parts will provide insufficient adhesion, whereas greater than about 50 parts resin per 100 parts latex is economically undesirable.

As to the rubber to which the polyester cord structures will adhere, the invention contemplates any compound of natural rubber stock or any compound of synthetic rubber stock such as polymerized isoprene, or polymerized butadiene, or polymerized halogen substituted butadiene such as a halogen-2-butadiene-1,3-polymer, for example, chloro-2-butadiene-1,3-polymer and other types.

Moreover, the rubber may contain any desired vulcanizers, stabilizers, accelerators, etc., singly or in any desired combination. In its preferred and common form, the invention contemplates any commercial compound rubber stock such as is commonly employed in the fabrication of automobile tires, hose, raincoat material, shoes, beltings, such as conveyor belts, fan belts, or other driving belts or the like.

The term "rubber" unless otherwise modified as used in the specification and claims, is intended to be used in its generic sense to include rubber substances, natural rubber, compound rubber, synthetic rubber, and the like.

Polyester tire cord materials are commercially available. In the manufacture of such materials, filaments of polyester are made into a yarn having from 100 to about 500 filaments in a total denier (a unit of weight for threads equal to approximately 0.05 grams per 450 meters of thread). This yarn is twisted in one direction 8 to 15 times and then combined with one or two other similarly twisted yarns by twisting them together in the reverse direction to give the resulting cord. Polyethylene terephthalate cord, DACRON T-68 which may have as a typical construction 1000 denier, 3-ply construction, having a 10.3/10/3 twist, is an example. The polyester cord material can be filament type polyester formed by the condensation of dihydric alcohols with organodibasic acids, particularly dicarboxylic acid, and self-condensation polymers of omega hydroxy carboxylic acids, the preferred materials being poly (ethylene terephthalate), poly (ethylene terephthalate-isophthalate), and poly (1,4-cyclohexylenedimethylene terephthalate).

The aqueous dips of the present invention should be adjusted to a pH of about between 8 and 10. Such pH adjustments may be made by the addition of an aqueous caustic solution such as sodium hydroxide or the addition of ammonium hydroxide to the adhesive dip to arrive at the desired pH. However, if the composition added thereto was a vinyl pyridine latex (pH 10.2), the dip may not require further pH adjustment. Too high pH values should be avoided because of the danger of attack (alkaline catalyzed hydrolysis of the polyester) on the polyester material used in the cord.

The dips thus prepared are ready for immediate use, or because of their stability, they may be held for as long as a two-week period which is beyond normal storage requirements in commercial practice. The adhesive composition may be applied to the surface of the polyester-shaped article by any conventional method, such as dipping, spraying, or spreading. The temperature at which the adhesive formulation is applied is not critical but should not be so low that congealing or other separations of the components occur and not so high that appreciable volatilization takes place. Temperatures between 10 and 40°C, turn out to be suitable. The treated polyester article is then dried and heated at a temperature of between 200° and 500°F., to drive off the volatile matter before being embedded in the rubber stock and the composite structure vulcanized. The conditions, such as temperature and duration of the heat treatment will vary according to the circumstances, but it is preferred that the polyester should be heated for between 1 second and 5 minutes at a temperature of at least 200°F.

It is during this drying or heat setting stage that the phenol-formaldehyde-resorcinol adhesive of the invention performs in a unique fashion. Upon initiation of drying heat the phenol-formaldehyde-resorcinol adhesive flows with the rubber latex and penetrates between the fibrils of the polyester tire cord. The resin does not cure and form an infusible thermoset, as one would normally expect with a resin of this sort, because the resin is deficient in formaldehyde, having only about 60-70 mole percent of formaldehyde based on the total phenylene compound. The conventional phenol-formaldehyde-resorcinol resins of the prior art have appreciably higher proportions of formaldehyde to total phenylene compound, generally about 120-200 mole percent. When these higher formaldehyde containing resins are subjected to heat the excess formaldehyde causes immediate crosslinking and curing of the resin while on the polyester tire cord surface. The resin of this invention, however, because it is deficient in formaldehyde will not crosslink and fuse immediately but instead will flow between the fibrils of the polyester tire cord as has been described above. After the resin has penetrated the polyester tire cord, the temperature of drying has increased and the dibenzyl ether linkages of the resin will rupture, releasing free formaldehyde which then crosslinks and cures the resin. Thus, the resin of the invention cures while within the polyester cord and acts as a chemical bridge binding together the polyester tire cord and the rubber latex. The phenol-formaldehyde-resorcinol resins of the prior art by being cured with excess formaldehyde never penetrate the polyester tire cord but cure on the cord surface and therefore, do not perform as well as the resins of the invention.

The compositions of the invention may be applied to the polyester-shaped article at any convenient stage during the process. For example, it may be applied to yarns which are subsequently twisted together to form cords, or they may be applied to the preformed cords, described above. The compositions having been applied to the surface of the polyester, and bonded thereto by heat, are stable and do not interfere with subsequent processing of the polyester.

The concentration of the adhesive composition, the traveling speed of the polyester-shaped article, (if a dipping technique is employed), the tension under which the polyester article is held, and other factors can be adjusted such that the pick-up of our adhesive composition is in the range of ¼ to 40 percent by weight of the polyester-shaped article after drying. It is preferred, however, that the pick-up be in the range of 1 to 20 percent by weight. The drying and heating treatments which are applied to the polyester-shaped article after application of the solution or emulsion of the adhesive can be combined with stretching, setting, or shrinking operations.

The successful bonding of rubber to tire cord is measured by the static adhesion test. The H-test has been employed by the rubber industry to determine the static adhesion of textile cord to rubber. This is specified as ASTM D 2138-67 and is employed in testing the adhesive dips of the present invention. The H-test is the method for the measurement of the force necessary to pull a single cord axially from a small block of rubber in which it is embedded. Ideally, the shear strength of the adhesive film to rubber or the adhesive film to the cord interface is measured. In performing the test, two small blocks of rubber are bonded through an interconnecting cord to form a specimen which resembles the letter H, thus characterizing the test. The repture is effected by pulling the specimens apart by means of two hook-like clamps, failure occurring when the bond in either of the blocks is ruptured. The data, of course, evaluated as to the size of the specimen and temperature at which test is performed. The invention is further illustrated by the following examples wherein parts are parts by weight unless otherwise indicated. The examples should be construed to illustrate the invention but not to limit the same.

EXAMPLE I 46.4 Parts per weight 90 percent phenol is charged to a reactor fitted with a stirrer, thermometer, and facilities for either reflux or distillation. Agitation is started and 30.8 parts of a 37 percent solution of formaldehyde and water and 1.9 parts of 50 percent aqueous caustic is added. A sample is removed after the aqueous caustic is added and the pH is found to be between 8.9 and 9.0 The reaction mass is heated to reflux and reflux is continued until the dilutability of the reaction mass is 1:1.1 to 1:0.9. Then 20.9 parts of resorcinol are added, and the condensation product is held at reflux for one hour. The phenol plus resorcinol to formaldehyde mole ratio is 1 to 0.63 and the phenol to resorcinol mole ratio is 70 to 30. Atmospheric distillation is started at the end of the reflux period and a major portion of the water is removed by the time the temperature of the vessel contents reaches 130°C. Distillation under reduced pressure removes substantially all the water and the major portion of the unreacted phenol. A vacuum of 26 to 28 inches is built up from 0 as the distillation progresses and the temperature increases to 165°-170°C. The distilled condensation product was then washed with a weak acid solution (70 to 1 water to form acid). The aqueous acid wash water was removed by decantation and a second wash with plain water was made. The final resin product was dissolved in water to form a 27 percent solid solution at a pH of 9.

An adhesive dip for polyester tire cord is made by mixing 13.2 parts of the above-formed resin, 68.4 parts of water, 10.9 parts of a commercial terpolymer latex (vinylpyridine-styrene-butadiene, GEN-TAC latex, 41 percent solids), and 7.5 parts natural rubber latex having 62% total solids to give a 50:50 synthetic rubber:-natural rubber solids ratio. The total dip solids of the resulting mixture is 12.5 percent with a resin to rubber ratio of 40:100 and a pH of 9.5.

The dip solution was then applied to polyester tire cord, DACRON T-68 (1000 denier, 3-ply construction, 10.3 to 10.3 twist), the dip cord cured for 2 minutes at 450°F. and bonded to standard laboratory stock natural rubber. Bonded stock thus prepared is evaluated for H-test adhesion according to ASTM method D-2138-67 and has a value of 21 pounds at 100°C. The H-test value for the resin prepared above but without the acid washing step was about 19 pounds.

EXAMPLE II

The procedure of Example I was repeated with the following changes. The phenol-formaldehyde precondensate was refluxed for periods of from 15 minutes to 3 hours to attain various dilutabilities. In addition formaldehyde was used at a concentration of 65 mole percent based on the moles of phenol plus resorcinol. The resins were combined with rubber laticies and applied to polyester tire cords as described in Example I. The results of the H-test are shown in Table I below. The results illustrate the necessity of the dilutability being within the range described herein.

TABLE I

| Reaction Conditions | Dilut-ability | ¼" H-Test Lbs. at 100± 1°C |
| --- | --- | --- |
| Short Phenol-Formaldehyde Reaction Time (15 min.) | Infinite | 10.4 |
| Normal Phenol-Formaldehyde Reaction Time (90 min.) | 1 to 1 | 25.6 |
| Long Phenol-Formaldehyde Reaction Time (3 hrs.) | 1 to 0.1 | 5.9 |

EXAMPLE III

The procedure of Example I was repeated with the exception that from 10 to 20 percent by weight of free resorcinol was added to the resin. Upon combination with rubber latex and application to polyester tire cord as described in Example I, the resulting H-test results are reported in the following table.

TABLE II

| Composition Resin | Weight Percent Resorcinol | ¼" H-Test Lbs. at 100± 1°C |
| --- | --- | --- |
| 100 | — | 17.4 |
| 90 | 10 | 16.0 |
| 85 | 15 | 11.2 |
| 80 | 20 | 10.4 |

These results definitely show free resorcinol reduces the adhesive quality of dip and must be removed by acid washing the resin.

EXAMPLE IV

To show the benefit of natural rubber latex in improving the adhesion of polyester tire cord to rubber stock, the procedure of Example I was repeated with the exception that the 50:50 ratio of GEN-TAC to natural rubber latex was adjusted to 100:0, 75:25, 25:75. The H-test results are tabulated as follows:

TABLE II

| GEN-TAC Natural Latex Ratio | pH of Dip[2] | ¼" H-Test Lbs. at 100± 1°C |
| --- | --- | --- |
| 100/0[1] | 9.7 | 14.8 |
| 75/25[1] | 9.6 | 18.5 |
| 50/50[3] | 9.5 | 19.4 |
| 25/75[1] | 9.5 | 17.2 |

[1]60:40:60 phenol:resorcinol:formaldehyde resin
[2]15% total solids at 40/100 resin/rubber
[3]70:30:60 phenol:resorcinol:formaldehyde resin

EXAMPLE V

The procedure of Example I was repeated with the exception that the percent solids of the resin and adhesive dip was varied from 8–25 percent and of a straight commercial terpolymer latex (vinylpyridine-styrene-butadiene, GEN-TAC latex, 41 percent solids) was used instead of the 50:50 ratio of the cited commercial latex and natural rubber latex. The H-test results are listed in Table III.

TABLE III

| Per Cent Total Solids in Dip | Dip pH | ¼" H-Test Lbs. at 100± 1°C |
| --- | --- | --- |
| 8 | 9.65 | 18.4 |
| 10 | 9.65 | 18.9 |
| 15 | 9.60 | 17.2 |
| 20 | 9.60 | 15.6 |
| 25 | 9.60 | 14.1 |

[1]All dips at 40/100 resin/rubber

EXAMPLE VI

In order to show that an adhesive dip made with phenol-formaldhyde-resorcinol resin as taught in U.S. Pat. No. 2,211,951 is greatly inferior as compared to an adhesive dip prepared with a phenol-formaldehyde-resorcinol resin as taught in the invention, the following experiment was done.

An adhesive dip solution was prepared according to the procedure shown in Example I of U.S. Pat. No. 2,211,951. The procedure is as follows: An aqueous solution was prepared containing 1.11 parts of 90 percent phenol, 1 part by weight of resorcinol, and 5.41 parts by weight formaldehyde (37 percent), 0.41 parts by weight 50 percent aqueous sodium hydroxide, and 67.68 parts by weight of water. To this was added 24.39 parts by weight of a commercial terpolymer latex (vinyl-pyridine-styrene-butadiene, GEN-TAC latex, 41 percent solids). The phenol to formaldehyde mole ratio was 11 to 68. The phenol plus resorcinol to formaldehyde mole ratio was 1 to 3.38 and the phenol to resorcinol mole ratio was 54:46.

The polyester tire cord, DACRON T–68, 1000/3/10/10 construction was passed slowly through this solution, slowly enough to be thoroughly wet and then dried at a temperature of 185°F. The dip cord was then cured for 2 minutes at 450°F. and bonded to standard laboratory stock natural rubber. After curing, the polyester tire cord is not found to adhere very firmly to the rubber having an H-test value of only 3.2 pounds.

When the same procedure was used with the exception that rayon tire cord (Tyrex 1650 denier, 1650/2/12/12 construction) was used in place of the polyester tire cord an H-test adhesion value of 17.2 pounds was recorded.

EXAMPLE VII

Example VI was conducted with greater amounts of formaldehyde than that which is prescribed in the practice of this invention. For this reason, the procedure of Experiment VI was repeated with the exception that the formalin was reduced from 5.41 to 3.67 parts.

The phenol plus resorcinol to formaldehyde mole ratio was now only 1 to 2.3 which compares more favorably with the phenol plus resorcinol to formaldehyde mole ratio of about 1 to 0.60 as taught in this invention. The H-test result for polyester was only 3.2 pounds while for rayon it was 19.4 pounds, and surprisingly, for nylon, it was 17.2 pounds.

EXAMPLE VIII

Examples VI and VII were conducted with a phenol to resorcinol mole ratio of 11 to 9 which is lower than the 70 to 30 mole ratio taught in this invention. For this example, the procedure of Example VII was repeated with the exception that the phenol to resorcinol mole ratio was raised to 70:30. The H-test results for polyester tire cord was only 2.9 pounds while for nylon it was 13.8 and for rayon it was 16.4 pounds.

EXAMPLE IX

U.S. Pat. No. 2,211,951 teaches on Page 3, lines 36 to 40 of the left column and lines 50 to 70 of the right column that the phenol-formaldehyde-resorcinol ingredients can be partially polymerized before adding to the rubber latex and subsequently polymerizing on the tire cord. Supposedly, the phenol-formaldehyde and resorcinol will polymerize by allowing them to stand in solution, with catalyst, at 25° to 30°C for from 5 to 20 hours during which time condensation and polymerization allegedly occur. To show a resin prepared in this manner does not at all compare with a resin prepared according to the method of the invention, the following experiment was conducted.

An aqueous solution was prepared containing 1.81 parts of 90 percent phenol, 0.82 parts by weight of resorcinol and 2.99 parts by weight formaldehyde (37 percent), 0.61 parts by weight 50 percent aqueous sodium hydroxide and 71.37 parts by weight water. The ingredients were aged for 20 hours at room temperature and combined with 22.40 parts of a commercial terpolymer latex (vinylpyridine-styrene-butadiene, GEN-TAC latex, 41 percent solids). The phenol to formaldehyde mole ratio was 44 to 38. The phenol plus resorcinol to formaldehyde mole ratio was 1 to 1.5. The phenol to resorcinol mole ratio was 44 to 18. The dip solids were 12.4 percent and the resin to rubber ratio was 25 to 100. The dip pH was 9.87. Notice all the values are quite close to the values of an adhesive dip prepared according to the invention.

The dip solution was then applied to polyester tire cord, DACRON T-68 (1000 denier, 3-ply construction, 10.3 to 10.3 twist), the dip cord cured 2 minutes at 450°F. and bonded to standard laboratory stock natural rubber. Bond stock thus prepared was evaluated for H-test adhesion according to ASTM method D-2138-67 and had a value of only 3.0 pounds at 100°C.

What is claimed is:

1. A water insoluble phenol formaldehyde resorcinol resin comprising a phenylene portion which is from about 55 to about 75 mole percent phenol and from about 25 to about 45 mole percent resorcinol and a formaldehyde portion which is from about 60 to about 70 mole percent formaldehyde based on the phenylene portion and wherein the mole ratio of formaldehyde to phenol is from about 0.75:1 to 1.1:1 and wherein the resin is prepared by:
    a. reacting the phenol and the formaldehyde at a temperture between about 60°C and the boiling point of the phenol formaldehyde reaction mixture, under mildly alkaline conditions at an initial pH of about 8 to 10 until the phenol-formaldehyde reaction mixture has a molecular weight of 1,000–1,600 and a dilutability of from about 1:1.2 to about 1:0.8 at the pH of the phenol-formaldehyde reaction mixture;
    b. adding the resorcinol and reacting the phenol formaldehyde reaction mixture with the resorcinol to form a phenol formaldehyde resorcinol resin;
    c. distilling the phenol formaldehyde resorcinol resin to drive the reaction of step (b) to completion and to remove substantially all the water and unreacted phenol;
    d. washing the distilled phenol formaldehyde resorcinol resin with a dilute aqueous acid solution to remove the unreacted resorcinol and low molecular weight oligomers.

2. A phenol-formaldehyde resorcinol resin as in claim 1 wherein the phenylene portion is from about 60 to about 70 mole percent phenol and from about 30 to about 40 mole percent resorcinol.

3. In a polyester tire cord adhesive dip comprising a rubber latex and a phenolic resin, the improvement comprises using as the said resin a water insoluble phenol formaldeyde resorcinol resin comprising a phenylene portion which is from about 55 to 75 mole percent phenol and from about 25 to about 45 percent resorcinol and a formaldehyde portion which is from about 60 to 70 mole percent formaldehyde based on the phenylene portion and wherein the mole ratio of formaldehyde to phenol is from about 0.75:1 to 1.1:1 and wherein the resin is prepared by:
    a. reacting the phenol and the formaldehyde at a temperature between about 60°C and the boiling point of the phenol formaldehyde reaction mixture, under mildly alkaline conditions at an initial pH of about 8 to 10 until the phenol formaldehyde reaction mixture has a molecular weight of 1,000–1,600 and a dilutability of from about 1:1.2 to about 1:0.8 at the pH of the phenol formaldehyde reaction mixture;
    b. adding the resorcinol and reacting the phenol formaldehyde reaction mixture with the resorcinol to form a phenol formaldehyde resorcinol resin;
    c. distilling the phenol formaldehyde resorcinol resin to drive the reaction of step (b) to completion and to remove substantially all the water and unreacted phenol;
    d. washing the distilled phenol formaldehyde resorcinol resin with a dilute aqueous acid solution to remove the unreacted resorcinol and low molecular weight oligomers.

4. An improved polyester tire cord adhesive dip as in claim 3 wherein the phenylene portion is from about 60 to about 70 mole percent phenol and from about 30 to about 40 mole percent resorcinol.

5. A polyester tire cord treated with the adhesive dip of claim 3.

6. A polyester tire cord treated with the adhesive dip of claim 4.

* * * * *